May 14, 1957 W. A. HALL 2,791,854
METHOD OF MAKING ARTIFICIAL FLORA
Filed Oct. 14, 1952 2 Sheets-Sheet 1

INVENTOR.
William Alexander Hall
BY
Stedman B. Hoar
Agent

May 14, 1957 W. A. HALL 2,791,854
METHOD OF MAKING ARTIFICIAL FLORA
Filed Oct. 14, 1952 2 Sheets-Sheet 2

INVENTOR.
William Alexander Hall
BY
Stedman B. Hoar
Agent

United States Patent Office 2,791,854
Patented May 14, 1957

2,791,854

METHOD OF MAKING ARTIFICIAL FLORA

William Alexander Hall, Santa Ana, Calif., assignor to Realistic Latex Products, Costa Mesa, Calif., a partnership Application October 14, 1952, Serial No. 314,602

1 Claim. (Cl. 41—13)

This invention relates to artificial flora, including both flowers and foliage, and a method of manufacturing artificial flora.

It has long been the practice in making artificial flowers and foliage to cut the individual parts, such as petals, stamens, leaf forms, and others, and to assemble these parts by hand upon stems of wire or other suitable material. The parts to be assembled are often complex in design and so small as to be difficult to handle; when made of paper they are easily torn and crumpled. The extent of manual work results in many specimens of wilted appearance which must be commercially rejected. It is particularly difficult to hand-cut, stamp, or press any material—be it paper, cloth, or plastic sheeting—so as to produce the thin petal and leaf edges and thicker stem or central parts characteristic of many plants, or the curves and convolutions of, say, an orchid.

It is an object of this invention to provide artificial flora of great beauty and realism.

Another object of the invention is to provide a method for manufacturing artificial flora which eliminates much of the manual labor hitherto deemed necessary in such manufacture and which thereby greatly reduces the cost.

Still another object of the invention is to provide a method of manufacture which eliminates die-stamping of petals and leaves of artificial flora, saving not only the cost of dies but the large waste of material from which stampings are cut.

A more direct and specific object of my invention is to provide artificial flora, of design and construction which permit the mass manufacture of flora of superior realism by novel and economical methods.

A further precise object of my invention is to provide a method of artificial flora manufacture by which such features of natural flora as variations of color on a petal or leaf, or the curvature, fringe attenuation, fringe dentation or lobation, and venation of a petal or leaf, or the petiolation of a leaf or flower may be economically and realistically re-created in the product.

In carrying out my invention, I prepare a pattern plate of the flower, petal, or leaf to be reproduced, and upon one side of this pattern plate I form the flower, petal, or leaf by spraying or painting with suitable plastic material or by dipping in such material or by pressing on thin sheets or patches of such material. It will be noted that my process is not a molding process in the sense of an enclosed or injection mold wherein both side of a foliage element would be pressed or cast, but rather consists in building up a thin and realistic model of the desired flora element upon one side of a pattern plate. As material for the flora element I may use an artificial rubber such as neoprene but other materials of the general plastic class of natural or synthetic gums and resins which dry to a flexible, non-tacky consistency and which then readily peel and separate from the pattern and which hold their shape flexibly are also available and suitable.

The pattern plate for a single leaf or petal may be a thin metal sheet on a suitable support or for a complete corolla the plate may be an exact representation of the corolla, raised from a supporting block. In either case, the margins of the pattern plate are very thin, and are both raised and spaced laterally from the supporting structure so that material applied to the plate receives a sharp peripheral delineation, finding no surfaces contiguous to the edge of the pattern upon which it may drip, run, or spread. The pattern plate has whatever grooves and ridges are required to form the veins of leaves or the crinkles of petals and may have sprue-like openings or tubes for the placement of stems, stamens, and other flora elements. Such elements are pre-formed and are appropriately placed in or upon the pattern plate, where they receive a partial coating of the neoprene or similar material to bond them to the leaf or flower. The inside face of a flower will normally be formed against the pattern plate and the calyx side of the flower will be away from the pattern, so that the venation of the pattern is impressed on the side of the flower most usually observed, but buds and half-opened flowers may be formed with the calyx side against the pattern.

The plastic material used to form the artificial flora may be dyed or otherwise colored prior to its application to the pattern and may be applied in several layers. For example, white petals with pink edges may be achieved by coating the whole pattern with pink plastic material and then coating the central portion with white material. The green calyx of a flower may be achieved by coating the pattern to the margins thereof with material of the appropriate flower color and then applying a lamination or overcoating of green material in the central portion adjacent to the stem. Yellow spots on green leaves may be formed by flicking on spots of yellow material, either directly on the pattern before the green material is applied or upon the green material after the application of the latter. Leaf stems may be applied to leaves already formed of one layer of plastic material, and a second layer may be applied as a lamination upon and close to the stem. This will bond the stem to the leaf and also give that added thickness close to the stem which is natural to a leaf.

An important feature of the invention lies in its adaptability to flowers having different types of centers. By means of a sprue in the center of the pattern plate, clusters of stamens may be made to stand erect and yet be bonded to the corolla of petals. In like manner, although with slightly different technique as hereinafter explained, the sprue serves to place the central button of a daisy or similar flower accurately with respect to the individual radiating petals.

It will be apparent from the foregoing that my invention is capable of a multitude of adaptations. In the accompanying drawing only a few of the possible forms of flower and leaf patterns are shown, these being selected as being illustrative of principles of the invention sufficiently broad and general to enable a skilled artificer to devise and apply many modifications which come within the scope and spirit of the invention as hereinafter claimed.

Figure 1:
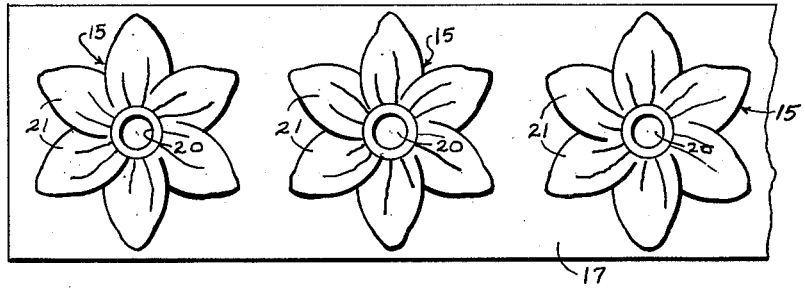
Fig. 1 is a partial top plan view of a multiple pattern on which flowers may be formed.
Figure 2:
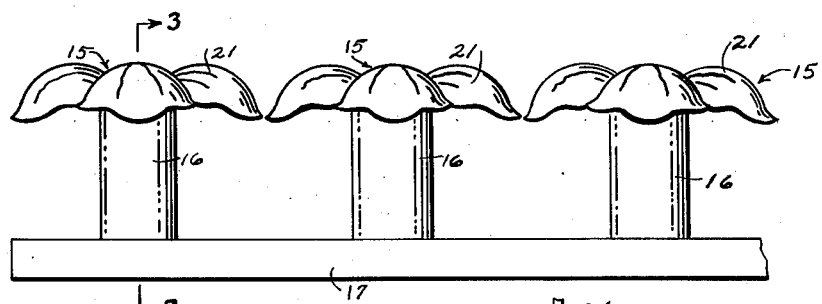
Fig. 2 is side elevation of the same pattern.
Figure 3:
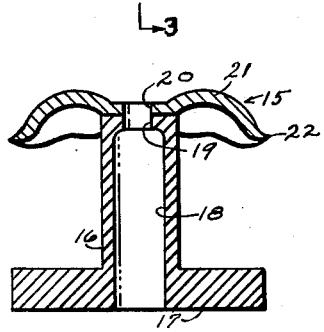
Fig. 3 is a sectional view through one of the pattern elements, on the line 3—3 of Fig. 2.
Figure 4:
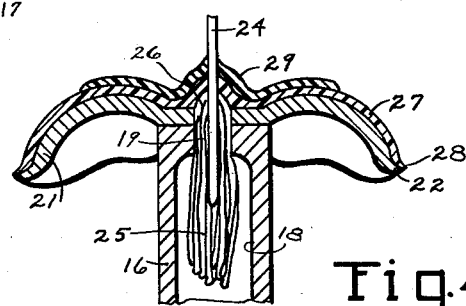
Fig. 4 is a enlarged sectional view showing a flower having stamens molded on the pattern element of Fig. 3.

Having reference to the details of the drawings, I have shown in Figs. 1 and 2 a plurality of individual flower patterns 15 mounted by means of hollow columns 16 upon a base 17. The bores 18 of the columns 16 extend through the base 17, and have narrower portions 19 connecting with openings 20 in the centers of the patterns 15. The petal forms 21 of the patterns 15 may be of any shape, varying in contour, curvature, venation, and other characteristics according to the flower which they represent. As shown best in Figs. 3 and 4, the patterns 15 terminate marginally in thin edges 22.

In forming a flower upon the patterns 15, suitable stems 24 are placed in the center of bunches of stamens 25 and the stems are threaded through the bores 18 from the base end of the bores so as to extend through the patterns 15 and to pull the stamens 25 into the narrow openings 19 and 20 so that the inward ends 26 of the stamens—in relation to the corollas to be formed—will be pressed tightly against the stems 24 and will extend slightly beyond the openings 20. The stamens 25 may be made of any suitable material, but preferably are small rods of the same material which is used to form the petals or of material to which the petal material will adhere. The petal material 27 is then applied to that side of the patterns 15 opposite to the columns 16. As hereinbefore stated, the petal material may be neoprene or other artificial rubber or any suitable latex or gum or plastic material which I classify generally as driable liquid gummy material and which is flexible and not tacky when dry. In central areas the material may be applied in tacky inlays pressed onto the patterns 15 or the patterns may be dipped in the liquid material, but preferably the liquid is applied as a liquid paint, either being sprayed or brushed on to the patterns 15. Whether pressed on, dipped on, or painted on, the petal material 27 is brought up around the stamens 25 protruding through the openings 20, and around the stems 24, thus bonding the petal material, the stamens, and the stems all together for each individual flower. By thus coating the stamen ends and a short length of the stem, the juncture of stamens and stem is concealed and also reinforced. The sharp edges 22, scalloped or lobated as may be desired, produce exactly conforming edges 28 on the petals; by spraying the material 27 the edges may be given a very realistic thinness. The clumping of the stamens 25 in the restricted openings 19 and 20 prevents the material 27 from passing through the openings to endanger the appearance of the spread stamens within the bores 18.

A calyx 29, of the same material 27 as the petals but usually dyed green, may be applied to the center of the flower, either by a paint-brush or in the form of tacky inlay strips. The calyx 29 adds to the reinforcement and concealment of the structure of the center of the flower.

Figure 7:
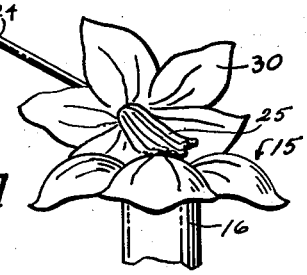
Fig. 7 is a perspective view showing a completed flower of the type shown in Fig. 5 being removed from the pattern plate.

When the petal material 27 has dried so that it is no longer tacky it will easily separate from the pattern plates 15 and the completed flowers may be pulled away from the patterns as units complete in all important details and requiring no subsequent trimming. Such a flower 30 is illustrated in Fig. 7.

Figure 5:
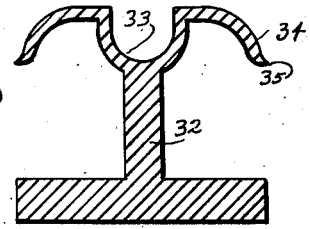
Fig. 5 is a sectional view through a modified form of pattern suitable for flowers having a central button, such as daisies.
Figure 6:
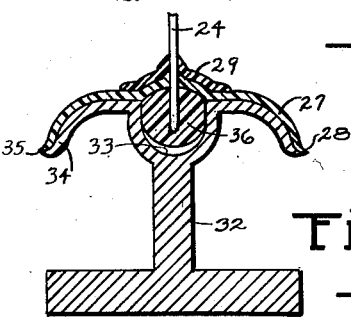
Fig. 6 shows a daisy molded on the pattern form of Fig. 5.

In Figs. 5 and 6 I have shown the molding on a flower such as a daisy upon a modified form of pattern plate. Solid columns 32 are mounted on the base 17 and have a cup-shaped depression 33 of their upper ends. The pattern plates 34 extend outwardly from the rim of the depression 33 and may have the form of separate narrow petals, thin and sharp along their margins as shown at 35. The stem 24 is set in a button 36 which may be of the same plastic material, suitably colored, used generally throughout the flowers. The button 36 is pushed into the depression 33, holding the stem upright. Petal material 27 and a calyx 29 are then applied as hitherto described. A tight fit of the button 36 in the depression 33 will prevent the button from being stained on its visible side by the material 27.

Figure 8:
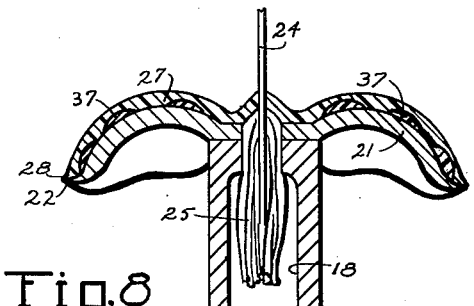
Fig. 8 is a sectional view showing the method of molding a flower in two colors.

Variations of color on the stem side of a flower may be applied in the same manner as the calyx 29. If spots or stripes are desired on the stamen side of a flower, they may be produced as shown in Fig. 8, by inlays 37. The inlays 37 may be applied to the pattern plates 15 as partly dried disks or strips or may be put on the pattern with a paint brush, being of the same driable liquid gummy material as the petals 27. The petals may be sprayed on after the inlays 37 are in place.

Figure 9:
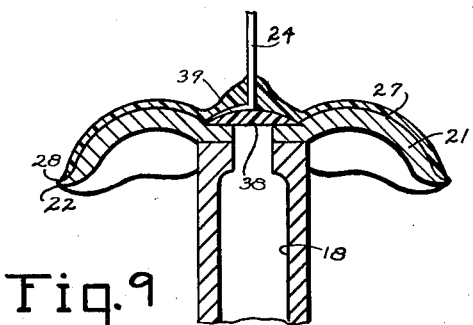
Fig. 9 is a sectional view showing the method of molding a flower having no central stamens or button worthy of duplication.
Figure 10:
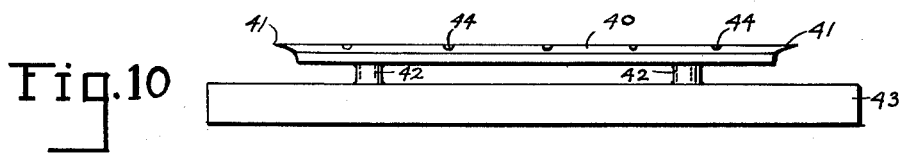
Fig. 10 is a side elevational view of a pattern for a leaf.
Figure 11:
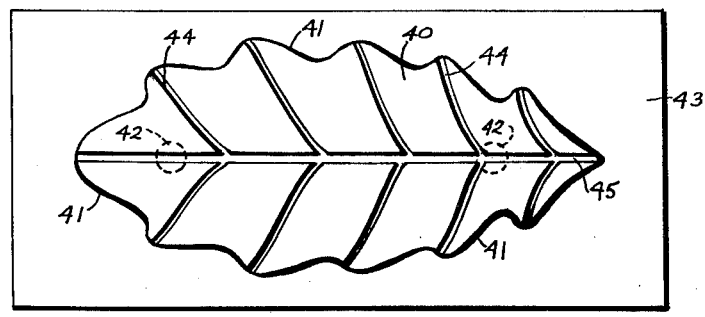
Fig. 11 is a plan view of the pattern of Fig. 10.

As some flowers have neither elongated stamens 25 nor a button 36 of sufficient thickness to engage the end of a stem, the stem may be held as in the arrangement of the flower shown in Fig. 9, the flower being assembled on the pattern plate 15 having a restricted opening 20. A disk 38 of driable liquid gummy material is permitted to dry until it will hold its shape although still tacky and is applied over the opening 20 to represent the flat center of a flower. The end 39 of the stem 24 is bent laterally and is pressed upon the disk 38 until it adheres so that the stem will stand upright. The petal material 27 is then sprayed on to bond the stem 24 to the disk 38.

Figures 12, 13:
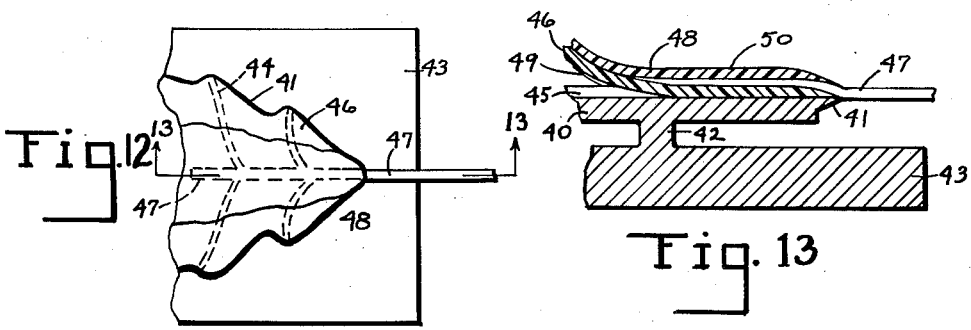
Fig. 12 is a fragmentary plan view showing a leaf molded on the pattern.
Fig. 13 is a sectional view on the line 13—13 of Fig. 12, the leaf being shown in part stripped from the pattern.

In Figs. 10 to 13 I have illustrated the formation of a leaf which, being foliate like the petals of a flower, may be formed in the same manner. A pattern plate 40, representative in area and in venation of the desired artificial leaf, has thin margins 41 spaced from all supporting structure, for which purpose the plate 40 may be supported on columns 42 on a base 43. Suitable simulation of the venation and petiolation of the leaf blade may be attained by shallow grooves 44 and 45. To form a leaf, a lamination 46 of driable liquid gummy material is spread upon the pattern plate 40 and a stem 47 is pressed up on the lamination 46 while the latter is still tacky. A second lamination 48 of material similar to the lamination 46 is then applied to bond the stem 47 between the two laminations, the laminations being bonded to each other. For small leaves which may be quickly spread or for thick leaves which do not dry quickly, the lamination 46 may be extended to the margins 41 and the lamination 48 may be placed only along the center part of the leaf, to conceal and to reenforce the junction of the leaf stem 47 with the blade of the leaf, as shown in Figs. 12 and 13. It will be apparent, however, that liquid gummy material may be sprayed in such a manner as to leave no visible dividing line at the edge of the narrower lamination, and it is then immaterial with respect to appearance which of the laminations 46 and 48 is applied first. If the leaf is large and thin, it may be advantageous to apply the under lamination 46 only along the center of the leaf and to extend the upper lamination 48 to the margins 41. In either arrangement, the so formed leaf has thin edges which may taper and which terminate abruptly at the margins 41, with no necessity for subsequent trimming. Spots, stripes, and indications of natural blemishes may be simulated by inlays, spattered, painted or pressed upon the pattern 40 as in the case of the inlay 49 or spattered, painted or pressed upon the upper surface of the leaf as in the case of the inlay 50. The inlays are preferably of the same material as the leaf, differently colored, and if representative of blisters or nodules they may be formed and partly dried to hold their shape before being pressed into place.

Because of the many possible variations, I do not desire the scope of my invention to be limited to the particular forms illustrated or to the use of any particular material except as such limitations of form and material are expressed in the appended claim.

I claim:

The method of making artificial representations of flora, which comprises: clumping together representations of central parts of a flower and a stem; placing said clumped representations and stem in a pattern plate representative of petals of said flower so as to seal a portion of said parts from one side of said plate, another portion of said parts and said stem being exposed on said one side of said plate; and applying driable liquid gummy material to said exposed portion of said parts and said stem and to said one side of said plate so as to terminate at the margins of the petal pattern of said plate and to bond together the so-formed representations of petals, said central parts and said stem.

References Cited in the file of this patent

UNITED STATES PATENTS

| | | |
|---|---|---|
| 1,730,628 | Rogers | Oct. 8, 1929 |
| 1,942,174 | Kaplan | Jan. 2, 1934 |
| 2,054,605 | Rogers | Sept. 15, 1936 |

OTHER REFERENCES

Modern Plastics—Vinyl Plants, June 1951, page 94.